(12) United States Patent
Ulko et al.

(10) Patent No.: US 11,911,776 B2
(45) Date of Patent: Feb. 27, 2024

(54) METHOD FOR INTEGRATED PROCESSING OF FINELY DISPERSED METAL-CONTAINING WASTE

(71) Applicants: Johann Eirich, Ruppertshofen (DE); Vitali Welmann, Schwaebisch Gmuend (DE)

(72) Inventors: Boris Nikolaevich Ulko, Kaliningrad (RU); Johann Eirich, Ruppertshofen (DE); Vitali Welmann, Schwaebisch Gmuend (DE)

( * ) Notice: Subject to any disclaimer, the term of this patent is extended or adjusted under 35 U.S.C. 154(b) by 45 days.

(21) Appl. No.: 17/602,515

(22) PCT Filed: Feb. 10, 2020

(86) PCT No.: PCT/RU2020/050018
§ 371 (c)(1),
(2) Date: Oct. 8, 2021

(87) PCT Pub. No.: WO2020/209761
PCT Pub. Date: Oct. 15, 2020

(65) Prior Publication Data
US 2022/0161271 A1 May 26, 2022

(30) Foreign Application Priority Data
Apr. 9, 2019 (RU) .......................... RU2019110441

(51) Int. Cl.
*B03C 1/00* (2006.01)
*B09B 101/30* (2022.01)

(52) U.S. Cl.
CPC .......... *B03C 1/002* (2013.01); *B03C 2201/18* (2013.01); *B09B 2101/30* (2022.01)

(58) Field of Classification Search
CPC ....... B03C 1/002; B03C 2201/18; B09B 3/00; B09B 5/00; B09B 2101/30; C22B 2201/18
See application file for complete search history.

(56) References Cited

U.S. PATENT DOCUMENTS

| | | | |
|---|---|---|---|
| 2009/0175782 A1 | 7/2009 | Krause et al. | |
| 2009/0255371 A1 | 10/2009 | Krause et al. | |
| 2013/0161262 A1 * | 6/2013 | Henley | E21B 43/40 |
| | | | 210/695 |
| 2020/0223752 A1 | 7/2020 | Geng et al. | |
| 2021/0079488 A1 * | 3/2021 | McNeish | C21B 13/0006 |

FOREIGN PATENT DOCUMENTS

| | | | | |
|---|---|---|---|---|
| CN | 106311718 A | | 1/2017 | |
| CN | 108686828 A | * | 10/2018 | ............... B03B 7/00 |
| CN | 109265029 A | | 1/2019 | |
| DE | 102006020840 A1 | | 11/2007 | |
| DE | 102006020841 A1 | | 11/2007 | |
| RU | 2363885 C1 | | 8/2009 | |
| RU | 2528918 C1 | | 9/2014 | |
| RU | 2588521 C1 | | 6/2016 | |
| RU | 2588910 C1 | * | 7/2016 | |
| RU | 2588910 C1 | | 7/2016 | |
| RU | 2634106 C1 | | 10/2017 | |

OTHER PUBLICATIONS

English Translation of RU 2634106 C1; Inv: Borisovich et al.; Pub. Date: Dec. 2016 (Year: 2016).*
Anonymous: "Andre Geim—Wikipedia", May 26, 2020, Retrieved from the Internet: URL:https://en.wikipedia.org/wiki/Andre_Geim#cite_note-epsrc-33.
Anonymous: Wikipedia, "Magnetic water treatment", May 26, 2020, Retrieved from the Internet: URL:https://en.wikipedia.org/wiki/Magneticwater_treatment.
Rowe, M.W., et al., "Effect of magnetic field on reduction of iron oxides: magnetite and wüstite", Apr. 14, 1977, Retrieved from the Internet: URL:https://www.nature.com/articles/266612a0.
Suchita, Rai, et al., Recovery of iron from bauxite residue using advanced separation techniques, Minerals Engineering, vol. 134, Feb. 10, 2019, pp. 222-231.
International Search Report issued in International Application No. PCT/RU2020/050018 dated Jun. 5, 2020.
Written Opinion of the International Searching Authority issued in International Application No. PCT/RU2020/050018 dated Jun. 5, 2020.

* cited by examiner

*Primary Examiner* — Joseph C Rodriguez
(74) *Attorney, Agent, or Firm* — Hoffmann & Baron, LLP

(57) ABSTRACT

A method for integrated processing of finely dispersed metal-containing waste, wherein the method includes mixing metal-containing waste with magnetic field activated water into a pulp, subjecting the pulp in a reaction chamber to a rotating magnetic field generated by rotating ferromagnetic elements, carried out in a vortex layer with a rotation speed of the ferromagnetic elements being at least 2800 rpm, until a magnetostriction effect and subsequent reduction of metal oxides occurs, and carrying out hydrocyclone separation of the metal oxides.

14 Claims, No Drawings

METHOD FOR INTEGRATED PROCESSING OF FINELY DISPERSED METAL-CONTAINING WASTE

CROSS-REFERENCE TO RELATED APPLICATIONS

The present application is the U.S. National Phase of PCT/RU2020/050018, filed on 10 Feb. 2020, which claims priority to Russian Patent Application No. 2019110441, filed on 9 Apr. 2019, the entire content of which are incorporated herein by reference.

BACKGROUND

Field

The invention relates to the field of chemical and metal industry and may be used for integrated processing of finely dispersed metal-containing waste, in particular, for processing red mud, as well as ash-slag waste of coal thermal power plants.

Related Art

Prior art method for integrated processing of ash-slag waste (Russian Patent No. 2588521, published 27 Jun. 2016), includes a system for ash-slag waste transportation, a waste preparation unit with elimination of incompletely burned material and a sequence of technological stages for selective extraction of iron-containing and aluminosilicate concentrates, as well as precious metals, wherein ash-slag waste not larger than 0.5 mm in size after desliming and elimination of incompletely burned material is subjected to magnetic separation, wherein the magnetic separation is performed in two stages: the first stage is performed in a weaker magnetic field as compared to the second stage, and weak magnetic fraction from the first magnetic separation stage is treated in a stronger magnetic field, wherein the magnetic fractions combined from the both stages of magnetic separation are subjected to a first helical separation so as to improve the quality of iron concentrate, and tailings from the second magnetic separation stage are subjected to a second helical separation to produce aluminosilicate concentrate, while heavy fraction from the second helical separation is transferred to a concentration table for extraction of precious metals, wherein elimination of incompletely burned material is carried out as a fraction of +0.5 mm when classified on a shaker.

Disadvantages of the prior art method are a complicated technological process scheme, as well as restricted size of processed ash-slag waste (not larger than 0.5 mm).

Prior art method for processing ash-slag waste from dumps of a hydro-ash removal system of coal fueled thermal power plants (Russian Patent No. 2363885, published 10 Aug. 2009), includes mechanical transportation of waste from the dump, waste liquefaction, separation of liquefied ash-slag mixture by fractions in at least two flows according to the size required for further utilization of ash-slag particles, condensing each flow along with separation of hollow microspheres and particles of unburned coal, as well as clarified water, and delivery of dehydrated mass of each fraction to corresponding disposal, wherein hydrodynamic activation of ash-slag waste with a liquefying medium is additionally carried out, using at least part of the pulp of the current flow from the hydro-ash removal system as a liquefying medium, wherein pulp feed rate for liquefaction and activation of ash-slag waste in the pulp mixing zone is set within the range of 20 to 40 m/s, and solid to liquid phase ratio in the resulting mixture is within the range of 1:20 to 1:10.

A disadvantage of the prior art method is its complicated technological processing scheme, as well as high water consumption. Besides, the prior art technical solution is characterized by high power consumption.

Prior art method for processing finely dispersed red mud (Russian Patent No. 2588910, published 10 Jul. 2016), includes grinding finely dispersed red mud and subsequently separating it by means of magnetic field into magnetic and non-magnetic fractions, and the grinding is carried out with simultaneous separation of red mud components by means of passing red mud through a disintegrator with rotating electromagnetic field at a rotation frequency in the range of 110 to 130 Hz and with intensity of 100 to 160 A/m, which separates the red mud particles onto metal oxides and silicon oxides, after which water is drained and dry residue is subjected to separation into magnetic and non-magnetic fractions by means of a magnetic field. Prior to grinding the red mud with simultaneous separation of its components, the red mud is heated to a temperature of 120-180° C.

A disadvantage of the prior art method is its complicated and cumbersome technological scheme. Red mud preheating to the temperature of 120-180° C. also adds to power consumption. Furthermore, the prior art technical solution is highly power consuming due to uneven electromagnetic field over flow cross-section, which entails the need to maintain high electromagnetic field intensity.

Prior art method (Russian Patent No. 2528918, published 20 Sep. 2014) of integrated processing of red mud containing hematite, chamosite, goethite, magnetite and aluminosilicates, by magnetic and gravity treatment to produce iron concentrate and aluminosilicate products initially subjects red mud to dispergation in the presence of sodium hexametaphosphate in rotary-pulsed apparatus, then to low-gradient wet magnetic separation in a field with intensity of 0.1-0.15 T, resulting in magnetite and bulk concentrate, the bulk concentrate being then subjected to two-stage high-gradient magnetic separation in a field with intensity of not less than 1.2 T, with extraction of magnetic and non-magnetic fractions, the magnetic fraction being then subjected to gravity enrichment by means of a concentration table, resulting in hematite concentrate and tailings, after which the non-magnetic fraction is combined with the tailings from the stage of gravity concentration and subjected to two-stage selective flocculation in the presence of a flocculating agent to separate the component that consists mainly of aluminum and silicon oxides, from an iron-containing product, which is enriched by high-gradient magnetic separation at field intensity of 0.5-0.7 T, resulting in additional iron-containing product, which is combined with the hematite concentrate to produce iron concentrate and residual aluminosilicates, which are combined with a component mainly consisting of aluminum and silicon oxides, resulting in an aluminosilicate product.

A disadvantage of the prior art method is lack of integrated character since it only recovers iron-containing compounds and aluminosilicates. Furthermore, the prior art technical solution is characterized by a complicated technological process, as well as high power consumption.

Red mud processing method (Russian Patent No. 2634106, published 23 Oct. 2017) is considered to be the closest prior art for the claimed invention, the method comprising the steps of grinding red mud and subsequently separating it into magnetic and non-magnetic fractions via magnetic separation, wherein prior to grinding the red mud is mixed with magnetic field activated water to obtain a slurry, and pulp flow is formed for grinding the red mud, which flow is passed through a fluidized bed of ferromagnetics subjected to a rotating magnetic field with varying rotation frequency of magnetic field resulting in cavitation in the pulp flow, the ferromagnetics oscillating in resonance with natural oscillations of the pulp particles within a frequency range of 14-25 kHz, whereby solid fractions of the pulp are disintegrated into finely dispersed components, which are subjected to magnetic separation after removal of water for a subsequent cycle.

The disadvantage of the prior art method is its lack of integrated character, since the described stages are only intended for grinding and subsequent separation of iron by means of magnetic separation.

The above-described technical solutions have a common disadvantage due to the fact that metal-containing compounds in the red mud are coated with a shell of silicon compounds (gel component) and a double electric layer, or only with a double electric layer in the case of ash-slag waste of coal thermal power plants. It should be noted that only elimination of these components would enable decomposing and extracting the greatest part of metal oxides present in the finely dispersed metal-containing waste.

SUMMARY

Technical Problem

The proposed invention resolves the technical problem of insufficient extraction of metal oxides included in finely dispersed metal-containing waste.

Technical result of the claimed invention consists in improved efficiency of finely dispersed metal-containing waste processing by virtue of extracting target products via elimination of gel component and double electric layer in red mud, and elimination of double electric layer in ash-slag waste.

Solution to Problem

The above-mentioned technical result is achieved by virtue of a method of integrated processing of finely dispersed metal-containing waste that includes the step of mixing metal-containing waste with magnetic field activated water into the state of a pulp, and a step of subjecting the pulp in a reaction chamber to a rotating magnetic field generated by rotating ferromagnetic elements, wherein the step of subjecting the pulp to the rotating magnetic field is carried out in a vortex layer with rotation speed of ferromagnetic elements being at least 2800 rpm until a magnetostriction effect and subsequent reduction of metal oxides occurs, after which the step of hydrocyclone separation of the latter is carried out.

In a further aspect, the proposed technical solution is characterized in that red mud is used as the finely dispersed metal-containing waste.

In a further aspect, the proposed technical solution is characterized in that ash-slag waste of coal thermal power plants is used as the finely dispersed metal-containing waste.

In a further aspect, the proposed technical solution is characterized in that magnetic field activated water has a pH of at least 7.

In a further aspect, the proposed technical solution is characterized in that viscosity of the pulp does not exceed 1.48 Pa·s.

In a further aspect, the proposed technical solution is characterized in that the rotating magnetic field is generated using an inductor with an asynchronous motor stator with a power of not less than 3 kW, with two three-phase current windings.

In a further aspect, the proposed technical solution is characterized in that ferromagnetic elements are made of nickel and coated with plastic.

In a further aspect, the proposed technical solution is characterized in that ferromagnetic elements are made of neodymium-iron-boron alloy and coated with plastic.

In a further aspect, the proposed technical solution is characterized in that the step of hydrocyclone separation is carried out in sealed containers in an inert gas environment.

The proposed combination of steps of the claimed method is aimed at extracting target products from finely dispersed metal-containing waste.

DETAILED DESCRIPTION

Magnetic treatment of water is carried out for the purpose of subsequent elimination of double electric layer and gel component (liquid silica) at the step of subjecting the resulting pulp to a rotating magnetic field in a vortex layer generated by ferromagnetic elements in a reaction chamber (with ferromagnetic elements rotating at a rotation speed of at least 2800 rpm). Under the effect of magnetic field water provides conditions for changing the state of crystal lattice of water molecules, namely conditions for dissociation of water to form positive hydrogen ions H+ and negative ions OH—. After magnetic treatment, water has pH of at least 7, which facilitates electrolysis process at subsequent steps. In case of water pH being less than 7, electrolysis process slows down, while it is difficult to separate metal oxides that are part of finely dispersed metal-containing wastes into an aqueous solution without electrolytic process.

Subsequent mixing of finely dispersed metal-containing waste with magnetic field activated water is carried out while monitoring viscosity of the resulting pulp. Pulp viscosity should not exceed 1.48 Pa·s. Increased viscosity affects the rotation speed of ferromagnetic elements and, hence, the resulting vortex layer. Pulp viscosity higher than 1.48 Pa·s hinders the motion of pulp at the step of subjecting the latter to a rotating magnetic field, which slows down the physical and chemical processes in the reaction chamber.

By virtue of processing finely dispersed metal-containing waste in a vortex layer with rotation speed of ferromagnetic elements being at least 2800 rpm until magnetostriction effect and subsequent reduction of metal oxides occurs, target products are extracted from the metal-containing waste, while the gel component and the double electric layer are eliminated in the red mud, and the double electric layer is eliminated in the ash-slag waste. Under magnetic field effect on the pulp, adsorbed H+ and OH— ions connect and neutralize each other, which results in disintegration of the double electric layer and the gel component. This process is stimulated by intense stirring, magnetohydrodynamic impacts (shock waves), ultrasound and other factors. As a result, solid particles, devoid of gel component and double electric layer, are capable of settling at an increased rate and enable chemical reactions of metal oxides reduction in the system. This allows to easily separate the resulting products by size and specific density at the step of hydrocyclone separation in an inert gas environment.

Exposure of the pulp to the rotating magnetic field generated by ferromagnetic elements rotating with a rotation speed of at least 2800 rpm brings about the following forces and energies in the reaction chamber:
- acoustic waves;
- magnetohydraulic pulse (impact);
- heat energy;
- sonic waves;
- mechanical cavitation;
- hydrodynamic cavitation;
- acoustic cavitation;
- mechanical impact force;
- mechanical friction force; and
- ultrasound.

Besides the aforementioned forces and energies, the following phenomena contribute to the processing:
- centrifugal force from magnetic elements rotation;
- centrifugal force from pulp rotation;
- electromagnetic waves; and
- electrolysis process.

These processes occur simultaneously and act on the chemical compounds included in the finely dispersed metal-containing waste, resulting in chemical elements in the form of metal oxides which are contained in the processed raw materials. Besides, the above-mentioned forces and energies ensure the decomposition of all complex compounds and release the bound water, content of which in the red mud may reach 60%, while no heat energy is required to eliminate moisture, and the resulting water may be used at the step of magnetization. Rotation speed of the ferromagnetic elements must be at least 2800 rpm, or not less than 3000 rpm in the preferred embodiment. The predetermined rotation speed brings about all of the above-mentioned forces and energies in the vortex layer. When the rotation speed of ferromagnetic elements is less than 2800 rpm, no disintegration of metal-containing waste or subsequent recovery and separation of metal oxides takes place, because in this case the system works as a mixer. Ferromagnetic elements made of nickel and coated with plastic increase magnetostriction by 200 times, the increase being by 1000 times or more in the case of those made of a neodymium-iron-boron alloy. Plastic coating of ferromagnetic elements prevents the base metal of the ferromagnetic elements from dissolving and dissipating into water at the step of water magnetization and into the pulp at the step of its exposure to rotating magnetic field. Use of such ferromagnetic elements ensures high magnetostriction parameters. To form a vortex layer, the number of ferromagnetic elements in the reaction chamber may be from one hundred to several thousand. In the process of electrolysis, ferromagnetic elements made of nickel or neodymium-iron-boron alloy act as electrodes which provide for hydrogen generation. Resulting hydrogen, in its turn, acts as a reducing agent in the system.

As a result of the processes described above, water pulp output from the reaction chamber is a mechanical mixture of water and chemical compounds: $Al_2O_3$; $SiO_2$; $Fe_2O_3$; $CaO$; $TiO_2$; $MgO$, oxides of rare earth metals and other metals included in the processed red mud and ash-slag waste of coal thermal power plants.

The step of separating the reduced metal oxides is carried out in hydrocyclones in an inert gas environment. Hydrocyclone separation in an inert gas environment in this case is advantageous due to fast separation, which provides high specific productivity, efficiency and reliability. It was found that in the air the activity of reduced metals decreases (i.e., oxygen is absorbed from the air), while the combination reaction releases a large amount of heat, which can lead to fire and explosion when the reduced oxides are separated in the air. To improve the safety of reduced metal oxides separation, hydrocyclone separation step is carried out in sealed containers in an inert gas environment.

The method is carried out as follows. The container is filled with water. When a predetermined volume is filled, water level switch is activated, which starts a water pump of a water supply line to a magnetic activator, and the magnetic activator is activated simultaneously with the activation of the water pump of the water supply line. When the magnetic water activator is activated, ferromagnetic elements create a vortex layer in the reaction chamber of the magnetic activator. After such treatment (pH of the water being not less than 7), water from the magnetic activator is provided to a container, from which a water pump feeds it to a storage tank via a pipeline.

Finely dispersed metal-containing waste (red mud or ash-slag waste of coal thermal power plants) is added to the magnetized water, which results in pulp with viscosity of not more than 1.48 Pa·s. Resulting pulp is provided to a magnetic activator, which is a reaction chamber consisting of a tube of non-magnetic material, an inductor with a stator of an asynchronous motor with a power of at least 3 kW with two three-phase current windings and a housing. Cylindrical ferromagnetic elements made of nickel and coated with plastic, or ferromagnetic elements made of neodymium-iron-boron alloy, also coated with plastic, are installed in the inner cavity of the non-magnetic cylindrical tube of the magnetic activator. The non-magnetic material reaction chamber may be configured as a tube made of stainless steel, composite materials, basalt, fiberglass, glass fiber, rubber and other materials. When three-phase current is applied, magnetic field inside the reaction chamber begins to rotate, at the same time rotating the ferromagnetic elements, in which magnetostrictive phenomena occur. Integrated processing of finely dispersed metal-containing waste takes place in a vortex layer formed by the ferromagnetic elements, wherein the rotation speed of ferromagnetic elements is at least 2800 rpm. The step of subjecting the pulp to the rotating magnetic field is carried out until magnetostriction effect appears and reduction of metal oxides subsequently occurs. The pulp is exposed to the rotating magnetic field for at least 30 seconds.

Resulting solution is fed to a group of cyclones by means of a slurry pump for separation by fractions and granulometric sizes of the resulting products in an inert gas environment, after which they are rinsed with water. Other separation techniques used in mining industry may be also employed. After the resulting oxides are rinsed, rinsing water and powders are separated in centrifuges, the water being returned into the technological process. The proposed method ensures reduction and separation of all metals contained in the red mud and ash-slag waste of coal thermal power plants.

The method is explained by examples.

EXAMPLES

Example 1. Integrated processing of red mud. At the first step, water was subjected to a magnetic field (pH=7), after which it was mixed with 50 kg of red mud into a state of pulp with viscosity of 1.15 Pa·s. Then a step of subjecting the pulp to a rotating magnetic field by means of ferromagnetic elements in the reaction chamber was performed, wherein the processing took place in a vortex layer, with the ferromagnetic elements rotating at a speed of about 2800 rpm. The step of subjecting the pulp to the rotating magnetic field was carried out until magnetostriction effect occurred and metal oxides were subsequently reduced. An inductor with a stator of a 5.5 kW asynchronous motor with two three-phase current windings, one of which was coupled to an external current source by a star connection scheme, and the other one was coupled by a triangle connection scheme, was used to generate the rotating magnetic field. Ferromagnetic elements were made of nickel and coated with plastic. After the pulp was exposed to the rotating magnetic field, the step of hydrocyclone separation of reduced metal oxides in an inert gas environment was carried out, after which the step of water removal took place. Red mud processing resulted in 24 kg of metal oxides, 17 kg of water and 8.69 kg mineral components, while material loss amounted to 0.31 kg. Resulting metals had particle sizes in the range of 2 to 50 microns. Chemical composition of resulting product samples is shown in Table 1.

TABLE 1

Chemical composition of resulting product samples

| Sample No. | Percentage, % | | | |
|---|---|---|---|---|
| | $Fe_2O_3$ | $TiO_2$ | $Al_2O_3$ | $SiO_2$ |
| 1 | 34.6 | 3 | 12.9 | 9.6 |
| 2 | 33.8 | 3.2 | 15.0 | 12.3 |
| 3 | 32.8 | 3.8 | 15.0 | 14.9 |
| 4 | 33.7 | 3.6 | 9.1 | 12.7 |
| 5 | 33.1 | 3.4 | 15.3 | 13.6 |
| 6 | 33.7 | 3.4 | 15.6 | 13.7 |

Besides, other oxides were obtained, namely MgO, V2O5, NaO, SO4 and others, their percentage in the samples being in the range of 0.01 to 2%. CaO content in the samples ranged from 2.5 to 12.5%.

Example 2. Integrated processing of ash-slag waste of coal thermal power plants. At the first step, water was subjected to a magnetic field (pH=7.5) after which it was mixed with 50 kg of ash-slag waste from coal thermal power plants into the state of a pulp with viscosity of 1.48 Pa·s. Then the step of subjecting the pulp to a rotating magnetic field by means of ferromagnetic elements in a reaction chamber was carried out, the process took place in a vortex layer, with the ferromagnetic elements rotating at the speed of 3000 rpm. The step of subjecting the pulp to the rotating magnetic field was carried out until magnetostriction effect occurred and metal oxides were subsequently reduced. Rotating magnetic field was generated by means of an inductor with a stator of a 5.0 kW asynchronous motor with two three-phase current windings, one of which was coupled to an external current source by a star connection scheme, and the other one was coupled by a triangle connection scheme. Ferromagnetic elements were made of neodymium-iron-boron alloy and covered with plastic. After the pulp was exposed to the rotating magnetic field, the step of hydrocyclone separation of reduced metal oxides in an inert gas environment was carried out, after which the metal oxides were rinsed with water. Chemical composition of resulting product samples is shown in Table 2.

TABLE 2

Chemical composition of resulting product samples

| Sample No. | Percentage, % | | |
|---|---|---|---|
| | $Fe_2O_3$ | $Al_2O_3$ | $SiO_2$ |
| 1 | 10.6 | 18.3 | 37.8 |
| 2 | 10.4 | 18.9 | 53.5 |
| 3 | 11.9 | 19.5 | 40.8 |
| 4 | 11.3 | 17.4 | 47.1 |
| 5 | 16.8 | 15.0 | 50.5 |
| 6 | 7.0 | 15.0 | 60.8 |

Besides, other oxides were obtained, namely CuO, V2O5, Ag2O, TiO2; WO3, CrO, NiO; MoO2, MnO, BaO, SrO, SnO and others, their percentage the resulting product samples being in the range of 0.01 to 2%.

Therefore, as shown in the above specification, the technical result, which consists in improved efficiency of finely dispersed metal-containing waste processing by virtue of extracting target products via elimination of gel component and double electric layer in red mud, and elimination of double electric layer in ash-slag waste, is achieved.

The invention claimed is:

1. A method for integrated processing of finely dispersed metal-containing waste, the method comprising:
    a. mixing metal-containing waste with magnetic field activated water into a pulp;
    b. subjecting the pulp in a reaction chamber to a rotating magnetic field that causes rotation of ferromagnetic elements disposed in the reaction chamber with a rotation speed of at least 2800 rpm, wherein processing of the metal-containing waste of the pulp is carried out in a vortex layer that is formed by the rotation of the ferromagnetic elements at the rotation speed, until a magnetostriction effect and subsequent reduction of metal oxides occurs; and
    c. carrying out hydrocyclone separation of the metal oxides as reduced.

2. The method for integrated processing of finely dispersed metal-waste according to claim 1, wherein red mud is used as the metal-containing waste.

3. The method for integrated processing of finely dispersed metal-containing containing waste according to claim 1, wherein ash-slag waste of a coal thermal power plant is used as the metal-containing waste.

4. The method for integrated processing of finely dispersed metal-containing containing waste according to claim 1, wherein the magnetic field activated water has a pH of at least 7.

5. The method for integrated processing of finely dispersed metal-waste according to claim 1, wherein viscosity of the pulp does not exceed 1.48 Pa·s.

6. The method for integrated processing of finely dispersed metal-containing waste according to claim 1, further comprising generating the rotating magnetic field using an inductor with an asynchronous motor stator with a power of not less than 3 kW, with two three-phase current windings.

7. The method for integrated processing of finely dispersed metal-containing waste according to claim 1, wherein the ferromagnetic elements are made of nickel and coated with plastic.

8. The method for integrated processing of finely dispersed metal-containing waste according to claim 1, wherein the ferromagnetic elements are made of neodymium-iron-boron alloy and coated with plastic.

9. The method for integrated processing of finely dispersed metal-containing waste according to claim 1, wherein the hydrocyclone separation is carried out in sealed containers in an inert gas environment.

10. The method for integrated processing of finely dispersed metal-containing waste according to claim 1, wherein the pulp is subjected to the rotating magnetic field at the rotation speed for at least 30 seconds.

11. The method for integrated processing of finely dispersed metal-containing waste according to claim 1, wherein the rotation speed is not less than 3000 rpm.

12. The method for integrated processing of finely dispersed metal-containing waste according to claim 1, wherein a number of the ferromagnetic elements disposed in the reaction chamber is from one hundred to several thousand ferromagnetic elements.

13. The method for integrated processing of finely dispersed metal-containing waste according to claim 1, wherein the reaction chamber is a tube of non-magnetic material.

14. The method for integrated processing of finely dispersed metal-containing waste according to claim 13, wherein the non-magnetic material of the tube is one of stainless steel, composite material, basalt, fiberglass, glass fiber, rubber, or other non-magnetic material.

\* \* \* \* \*